United States Patent [19]

Li et al.

[11] Patent Number: 5,330,128
[45] Date of Patent: Jul. 19, 1994

[54] MAGNETIC TAPE CASSETTE WITH MOTION LIMITING FINGERS

[75] Inventors: Chi C. Li, Melody Garden, Hong Kong; Thomas J. Mott, Jr., Farmington Hills; P. Eric Petersen, V, Sterling Heights, both of Mich.

[73] Assignee: Producers Color Service, Inc., Southfield, Mich.

[21] Appl. No.: 763,538

[22] Filed: Sep. 23, 1991

[51] Int. Cl.$^5$ .......................................... G11B 23/087
[52] U.S. Cl. ................................. 242/345.2; 360/132; 242/347.1
[58] Field of Search .......................... 242/199; 360/132

[56] References Cited

U.S. PATENT DOCUMENTS

| | | | |
|---|---|---|---|
| 4,485,990 | 12/1984 | Ogiro et al. | 242/199 |
| 4,518,134 | 5/1985 | Oishi et al. | 242/199 |
| 4,687,157 | 8/1987 | Schoettle et al. | 242/199 |
| 4,706,149 | 11/1987 | Machida et al. | 242/199 |
| 4,802,044 | 1/1989 | Iwahashi et al. | 242/199 |
| 4,821,135 | 4/1989 | Nakamishi et al. | 242/199 |
| 5,092,536 | 3/1992 | Gelardi et al. | 242/199 |

FOREIGN PATENT DOCUMENTS

88/08196 10/1988 World Int. Prop. O. .......... 242/199

Primary Examiner—Daniel P. Stodola
Assistant Examiner—John Q. Nguyen
Attorney, Agent, or Firm—Barnes, Kissell, Raisch, Choate, Whittemore & Hulbert

[57] ABSTRACT

A magnetic tape cassette that includes a substantially rectangular housing and a pair of tape reels carried for rotation within the housing with a length of magnetic tape extending between the reels for recording and/or playback of information. An aperture in a sidewall of the housing affords external access to the tape by recording/playback apparatus, and posts within the housing guide the magnetic tape between the reels adjacent to the sidewall aperture. The guideposts are mounted with the housing so as to be disposed entirely internally of the tape between the reels such that the information surface of the tape is free of contact with the guideposts or any other portion of the cassette as the tape is wound between the reels past the sidewall aperture. A circular array of circumferentially spaced fingers are integral with the housing surrounding each of the reels radially spaced from the reels so as to limit lateral motion of the reels while maintaining alignment of the reels with apertures in the bottom wall of the housing for engagement with the tape drive mechanisms of recording/playback apparatus.

8 Claims, 3 Drawing Sheets

MAGNETIC TAPE CASSETTE WITH MOTION LIMITING FINGERS

The present invention is directed to magnetic tape cassettes, and more particularly to an economical video cassette that is particularly well adapted for direct mail advertising and the like.

BACKGROUND AND OBJECTS OF THE INVENTION

Magnetic tape cassettes are widely employed for recording and playback of video and audio information both for consumer and commercial applications. A typical cassette for recording and/or playback of audio/video information in the so-called VHS format includes a generally rectangular housing formed by molded plastic upper and lower housing sections. A pair of reels are rotatably carried within the housing in general alignment with a pair of apertures in a bottom wall of the housing for engagement with external recording/playback apparatus for driving tape back and forth between the reels. An aperture in a sidewall of the housing is normally closed by a cover, which is automatically opened upon insertion of the cassette into recording/playback apparatus for affording access to a reach of the tape that extends between the reels across the sidewall aperture. Guideposts are carried by the housing for guiding the tape across the sidewall aperture between the reels.

Although magnetic tape cassettes of the described character have enjoyed substantial commercial acceptance and success, improvements remain desirable. In particular, details of construction of the cassette described above makes it very expensive for use in applications where the cassette is intended to be used a limited number of times and then discarded, such as in direct mail video advertisements. It is essential in applications of this character that the tape cassette be as inexpensive as possible.

One major cost in conventional magnetic tape cassette constructions is associated with guideposts that contact the outer or recording face of the magnetic tape as the tape traverses the sidewall aperture between the reels. Since these guideposts contact the recording surface, it is critical that the posts be precisely manufactured so as to avoid damage to information magnetically recorded on the tape or to the tape itself. Other major costs with standard magnetic tape cassettes are associated with a locking mechanism for holding the front cover closed until the tape is inserted into a recording/playback machine, with leaf springs for holding the tape against the guideposts and/or holding the reels against the bottom wall of the housing, and brake mechanisms for restraining rotation of the tape reels when the cassette is not inserted into a recording/playback machine.

It is a general object of the present invention to provide a magnetic tape cassette in which the costs of production are greatly reduced as compared with conventional cassette constructions. Another and more specific object of the present invention is to provide a video tape cassette that is particularly well adapted for limited-use and disposable applications such as direct mail advertisement. Yet another object of the present invention is to provide a magnetic tape cassette, particularly a video tape cassette, that exhibits improved performance in operation in terms of reducing video dropouts during recording and/or playback.

SUMMARY OF THE INVENTION

A magnetic tape cassette in accordance with a presently preferred embodiment of the invention includes a substantially rectangular housing and a pair of reels carried for rotation within the housing with a length of magnetic tape extending between the reels for recording and/or playback of information. An aperture in a sidewall of the housing affords external access to the tape by recording/playback apparatus, and posts within the housing guide the magnetic tape between the reels adjacent to the sidewall aperture so as to define an information surface on the tape facing externally as the tape traverses the sidewall aperture and on which information is magnetically recorded for playback, and a blank surface facing internally of the housing on which no such information is recorded. In accordance with a first important feature or aspect of the present invention, the guideposts are mounted with the housing so as to be disposed entirely internally of the tape between the reels, such that the information surface of the tape is free of contact with the guideposts or any other portion of the cassette as the tape is wound between the reels past the sidewall aperture. The guideposts may comprise posts integrally molded with one of the molded plastic sections of the housing, or may comprise metal or plastic rollers mounted between the housing sections.

In accordance with a second important aspect or feature of the present invention, which may be employed independently of or more preferably in combination with the first aspect or feature described above, a circular array of circumferentially spaced fingers are integral with the housing surrounding each of the reels radially spaced from the reels so as to limited lateral motion of the reels while maintaining alignment of the reels with apertures in the bottom wall of the housing for engagement with the tape drive mechanisms of recording/playback apparatus. In the preferred embodiment of the invention in which the housing is composed of upper and lower sections of molded plastic construction, the fingers comprise finger sections integrally molded with each of the housing sections at positions for alignment with the fingers on the opposing section. A cylindrical wall interconnects the fingers on each housing section for strengthening the fingers, the wall being interrupted at a position for passage of the tape to the guideposts and thence to the opposing reel.

For further reducing the cost of the magnetic tape cassette provided by the invention, the usual clear windows provided in the upper section of the housing are deleted, as are the tape spring pad for holding the recording surface of the tape against a guide pole, the locking mechanism for holding the front cover closed, and the entire brake mechanisms for restraining rotation of the reels when the cassette is out of a machine. Furthermore, the leaf spring that holds the reels against the bottom wall of the housing is of plastic rather than metal construction, and is ultrasonically welded or otherwise permanently secured to the inside surface of the upper housing section. The housing sections are permanently secured to each other by ultrasonic welding or the like, thereby reducing the cost of the screws and of assembly of the housing sections in conventional tape cassettes.

BRIEF DESCRIPTION OF THE DRAWINGS

The invention, together with additional objects, features and advantages thereof, will be best understood from the following description, the appended claims and the accompanying drawings in which:

DETAILED DESCRIPTION OF PREFERRED EMBODIMENTS

Figure 1:
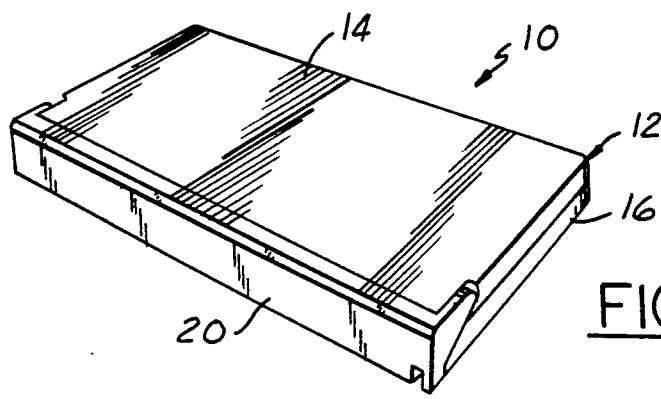
FIG. 1 is a perspective view of a video tape cassette in accordance with one presently preferred embodiment of the invention.
Figure 2:
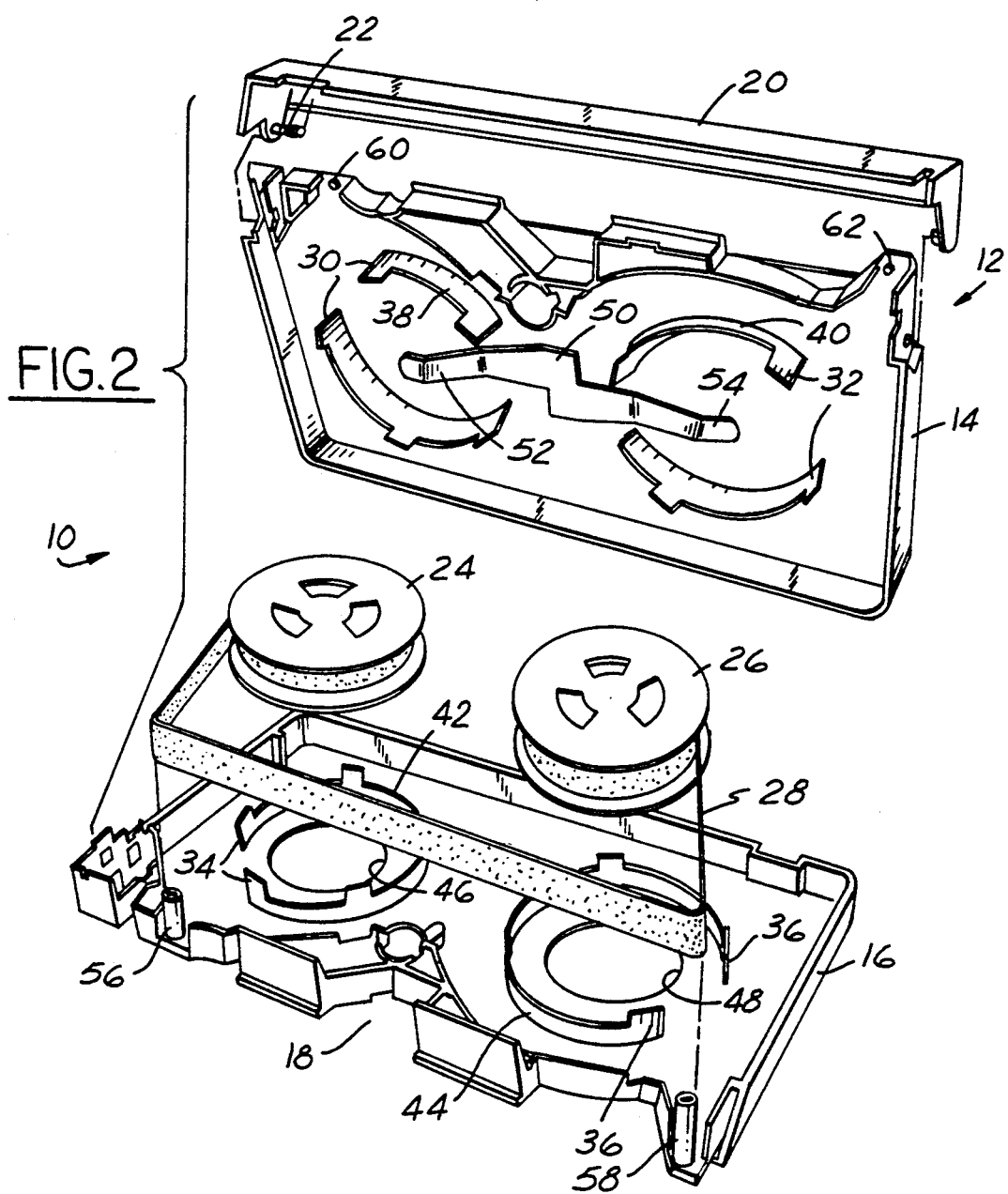
FIG. 2 is an exploded perspective view on an enlarged scale of the tape cassette illustrated in FIG. 1.
Figure 3:
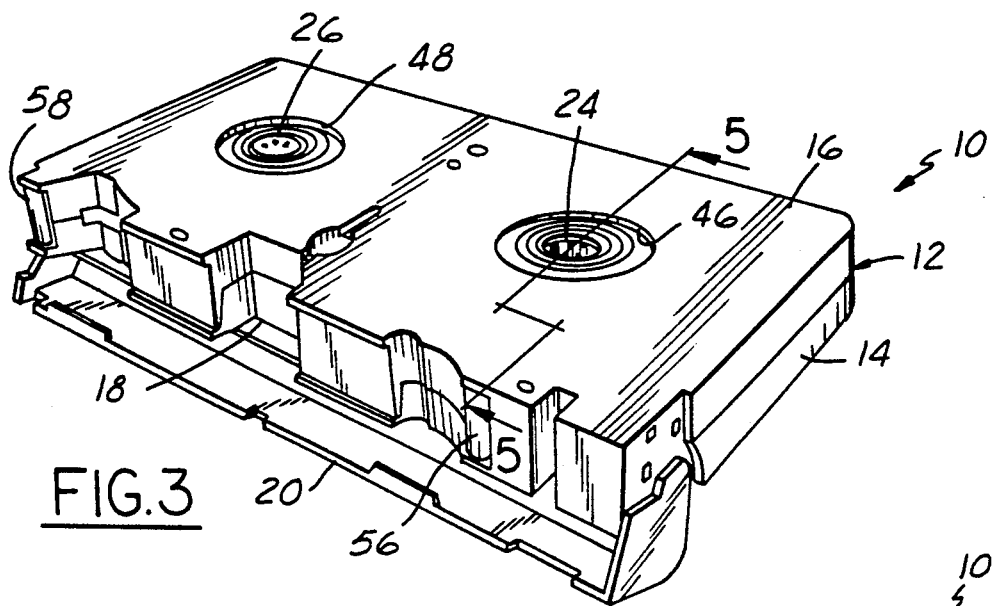
FIG. 3 is a bottom perspective view of the tape cassette illustrated in FIGS. 1 and 2 with the front cover open.
Figure 4:
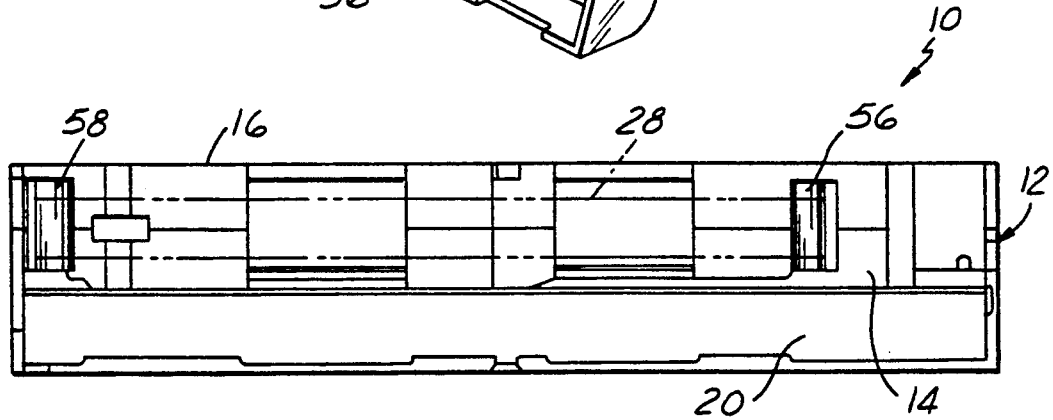
FIG. 4 is a side elevational view of the cassette illustrated in FIG. 3.
Figure 5:
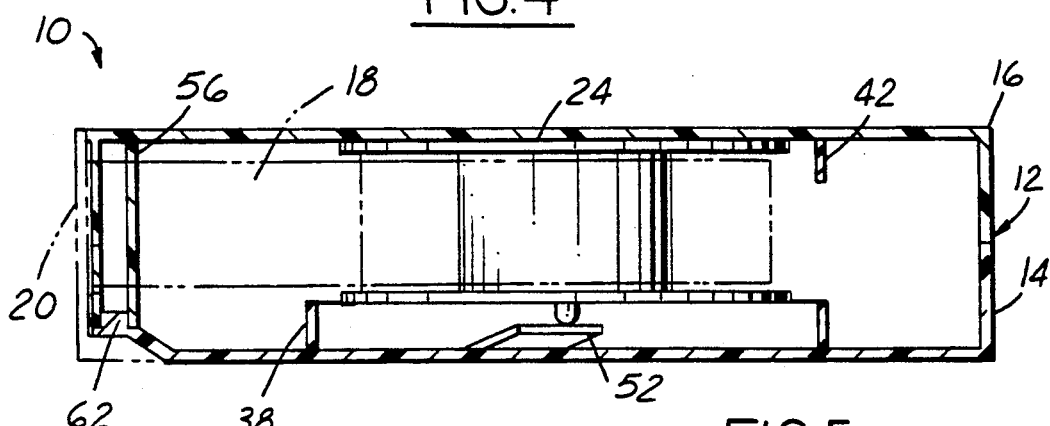
FIG. 5 is a sectional view taken substantially along the line 5—5 in FIG. 3.

FIGS. 1-5 illustrate a magnetic tape cassette 10 in accordance with a presently preferred implementation of the invention suitable for recording and/or playback of audio/video information in so-called VHS format. (It will be appreciated that the principles of the invention may be applied equally as well to video tapes of other format, as well as to digital audio tapes for example.) Cassette 10 includes a housing 12 composed of an upper housing section 14 and a lower housing section 16, both of one-piece homogeneously integral molded plastic construction. Housing sections 14,16 are ultrasonically welded or otherwise permanently secured to each other to form the generally rectangular outline of housing 12 with an aperture 18 extending along one long sidewall of the housing. A cover 20 is rotatably mounted on upper housing section 14 and is urged by a coil spring 22 normally to cover aperture 18. Cover 20 is pivoted to the open position illustrated in FIGS. 3 and 4 by conventional means in recording/playback apparatus for affording access to the magnetic tape that extends along housing aperture 18.

Within housing 12, a pair of reels 24,26 are disposed for free rotation between the upper and lower housing edges about parallel axes of rotation. A length of magnetic recording tape 28 extends between reels 24,26 tangentially from the opposed outer circumferential edges of the reel. A circular array of circumferentially faced fingers 30,32 are homogeneously integral with and depend from the inner surface of upper housing section 14 surrounding reels 24,26 respectively. Likewise, a circular array of circumferentially spaced fingers 34,36 are homogeneously integral with and internally upstanding from lower housing section 16 surrounding reels 24,26 and aligned with fingers 30,32 respectively. Aligned finger pairs 30,34 and 32,36 each have a common diameter that is greater than the diameter of the associated reels 24,26 (which are themselves equal) captured therewithin for limiting motion of the respective reels laterally of their axes of rotation while permitting free rotation thereof. Limited lateral motion permits self-alignment of the reels with the drive sprockets of conventional recording/playback machines as the cassette is inserted therein. In this connection, it will be noted from the drawings that reels 24,26 are of lesser diameter than conventional reels.

Arrays of fingers 30,32,34,36 are respectively interconnected by a substantially cylindrical wall 38,40,42,44 homogeneously integral with the associated fingers and housing sections for strengthening the fingers. Each wall 38-44 is interrupted for permitting passage of video tape 28 to and from the reels captured by the fingers. Lower housing section 16 includes a pair of apertures 46,48 respectively aligned with reels 24,26 captured by the housing fingers for access to the reels by reel drive mechanisms in recording/playback apparatus. A leaf spring 50 of plastic composition is mounted internally of upper housing section 14, and has a pair of arms 52,54 that extend radially through interruptions in cylindrical walls 38,40 for resilient engagement with reels 24,26 so as to urge the reels against the opposing surface of lower housing section 16 adjacent to apertures 46,48.

A pair of guideposts 56,58 are positioned at opposed ends of housing aperture 18 for guiding tape 28 across aperture 18. Magnetic tape 28 extends from reel 24 around guidepost 56, along aperture 18, around guidepost 58 and thence to reel 26. It will be noted that guideposts 56,58 engage the inner blank or non-recording surface of magnetic tape 28. The reach of tape 28 between reel 24 and guidepost 15, the reach of tape 28 between guidepost 58 and reel 26, and indeed the entire reach of tape 28 between reels 24,26 is entirely free of contact with the outer or recording surface of tape 28. The construction of the present invention thus eliminates the guide rollers and/or poles of conventional cassette constructions that contact the recording surface of the tape. This not only eliminates the expense associated with manufacture and assembly of these critical components in prior art cassettes, but also improves performance of the cassette in terms of drop-outs or the like caused by contact of the tape recording surface with such imperfections in guide rollers or poles. In this respect, it bas been found that the video cassette of the present invention outperforms conventional VHS video cassettes in terms of reducing such video drop-outs.

Figure 6:
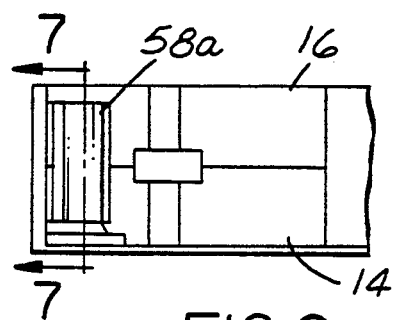
FIG. 6 is a fragmentary view of the cassette illustrated in FIG. 3 showing a second guidepost construction in accordance with a second embodiment of the invention.
Figure 7:
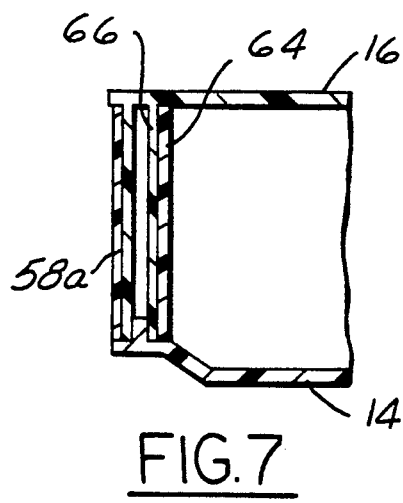
FIG. 7 is a sectional view taken substantially along the line 7—7 in FIG. 6.
Figure 8:
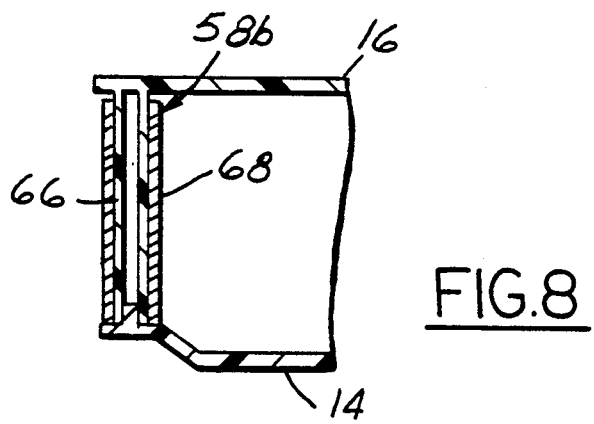
FIG. 8 is a fragmentary sectional view similar to that of FIG. 7 showing another modified embodiment of the invention.

In the preferred embodiment of the invention illustrated in FIGS. 1-5, guideposts 56,58 are of hollow construction and are molded homogeneously integral with lower housing section 16. Guideposts 56,58 register with buttons 60,62 (FIGS. 2 and 5) molded internally of upper housing section 14 for adding strength to the guideposts. FIGS. 6 and 7 illustrate a modified embodiment of the invention in which guidepost 58a (and guidepost 56a not shown) takes the form of a hollow sleeve 64 of low-friction plastic composition, such as acetal, mounted on posts 66 integral with the housing sections and captured in compression and against rotation between the housing sections in assembly. FIG. 8 illustrates another modified embodiment of the invention in which guidepost 58a (and guidepost 56a now shown) comprises a hollow guide 68 of metallic composition rotatably mounted on posts 66 between upper and lower housing sections 14,16.

We claim:

1. In a tape cassette that includes a substantially rectangular housing having upper and lower housing sections of molded plastic construction, a pair of tape reels carried for rotation within said housing, a length of magnetic tape extending between said reels for recording and/or playback of information, an aperture in a sidewall of said housing for external access to said tape by a recording/playback apparatus, and a pair of apertures in a bottom wall of said housing aligned with said reels for external access to said reels by reel drive means of the recording/playback apparatus, the improvement in which said cassette further comprises motion-limiting means comprising a circular array of angularly spaced concentric discrete arcuate fingers integrally molded on each said section for opposed alignment with fingers on the opposing section to form a segmented cylindrical enclosure surrounding each said reel and radially spaced from each said reel so as to limit lateral motion of said reels and maintain alignment of said reels with said apertures in said bottom wall while permitting free rotation of said reels, wherein said motion-limiting means further comprises a plurality of arcuate wall segments integrally interconnecting the fingers of each said array, said wall segments having a radius of curvature identical to said fingers, and being of a height less than said fingers and positioned on the opposed sections for spaced opposed alignment to cooperate with said fingers to form said enclosure with a gap for permitting travel of said tape to and from the associated reel.

2. The cassette set forth in claim 1 further comprising a unitary leaf spring of plastic composition internally affixed to an upper wall of said housing and having opposed ends extending into each said segmented cylindrical enclosure through a gap therein for urging said reels against said bottom wall.

3. The cassette set forth in claim 2 wherein aid upper and lower housing sections are permanently secured to each other to capture said tape and reels within said housing.

4. The cassette set forth in claim 1 further comprising guide means within said housing for guiding said magnetic tape between said reels adjacent to said sidewall aperture so as to present an information surface on said tape facing externally of said housing as said tape is routed past said aperture on which information is magnetically recorded for playback, a blank surface on which no such information is recorded facing internally of said housing, said guide means being mounted within said housing so as to be disposed entirely internally of said tape extended between said reels, such that said information surface of said tape is free of contact with said guide means or any portion of said cassette as said tape is wound between said reels past said aperture.

5. The cassette set forth in claim 4 wherein said guide means comprises a pair of guideposts disposed in fixed position between said sections spaced from each other along said sidewall at opposed ends of said aperture.

6. The cassette set forth in claim 5 wherein said posts are of plastic composition molded homogeneously integral with one of said sections.

7. The cassette set forth in claim 5 wherein said guideposts are of low-friction plastic composition separate from said housing sections and are captured in fixed position between said sections.

8. The cassette set forth in claim 5 wherein said guideposts are of metallic composition, and wherein said housing includes means mounting said guideposts for free rotation about fixed axes at opposed ends of said aperture.

* * * * *